United States Patent
Sassi et al.

(10) Patent No.: US 9,327,666 B2
(45) Date of Patent: May 3, 2016

(54) PASSIVE STRUCTURAL DESIGN THAT IMPROVES IMPACT SIGNAL DURING SIDE IMPACT

(71) Applicant: Ford Global Technologies, LLC, Dearborn, MI (US)

(72) Inventors: Abdelmonaam Sassi, Windsor (CA); Matthew B. Makowski, Northville, MI (US); Aruna Nandadeva Tilakasiri, Billericay (GB); Diego Santos, Koeln (GB); Joseph Edward Abramczyk, Farmington Hills, MI (US); Echung Su, Rochester Hills, MI (US); Jonathan Beaudoin, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/206,253

(22) Filed: Mar. 12, 2014

(65) Prior Publication Data
US 2015/0258956 A1    Sep. 17, 2015

(51) Int. Cl.
*B60R 21/00*     (2006.01)
*B60R 21/0136*   (2006.01)
*B62D 21/15*     (2006.01)
*B62D 25/20*     (2006.01)

(52) U.S. Cl.
CPC .......... *B60R 21/0136* (2013.01); *B62D 21/157* (2013.01); *B62D 25/2036* (2013.01)

(58) Field of Classification Search
CPC ............................ B60R 21/21; B60R 21/0136
USPC .................. 296/187.12, 209, 193.07
See application file for complete search history.

(56) References Cited

U.S. PATENT DOCUMENTS

| | | |
|---|---|---|
| 6,378,933 B1 * | 4/2002 | Schoen et al. ........... 296/187.02 |
| 7,605,691 B2 | 10/2009 | Nonaka et al. |
| 8,070,215 B2 | 12/2011 | Yoshioka et al. |
| 8,113,541 B2 | 2/2012 | Mampe |
| 8,113,572 B2 | 2/2012 | Mildner et al. |
| 2006/0232105 A1 * | 10/2006 | Egawa et al. ............ 296/193.07 |
| 2011/0023628 A1 * | 2/2011 | Hamabe et al. .......... 73/862.381 |
| 2013/0026786 A1 * | 1/2013 | Saeki ....................... 296/187.12 |

FOREIGN PATENT DOCUMENTS

| | | |
|---|---|---|
| EP | 0536624 A1 | 4/1993 |
| JP | 05116592 | 5/1993 |

* cited by examiner

*Primary Examiner* — Joseph D Pape
(74) *Attorney, Agent, or Firm* — Frank A. MacKenzie; Price Heneveld LLP

(57) ABSTRACT

A vehicle includes a floor structure and one or more tubular rocker structures. Each rocker structure includes an outer cladding and/or an inner structure extending across an interior space of the rocker structure. At least one acceleration sensor is connected to a central portion of the floor structure to detect acceleration resulting from a crash event. The vehicle may also include pressure sensors that detect changes in pressure in the door cavities that result from side impacts. The cladding and/or inner structure of the rockers reduce the time required to detect acceleration due to a side impact on the rocker structures.

19 Claims, 6 Drawing Sheets

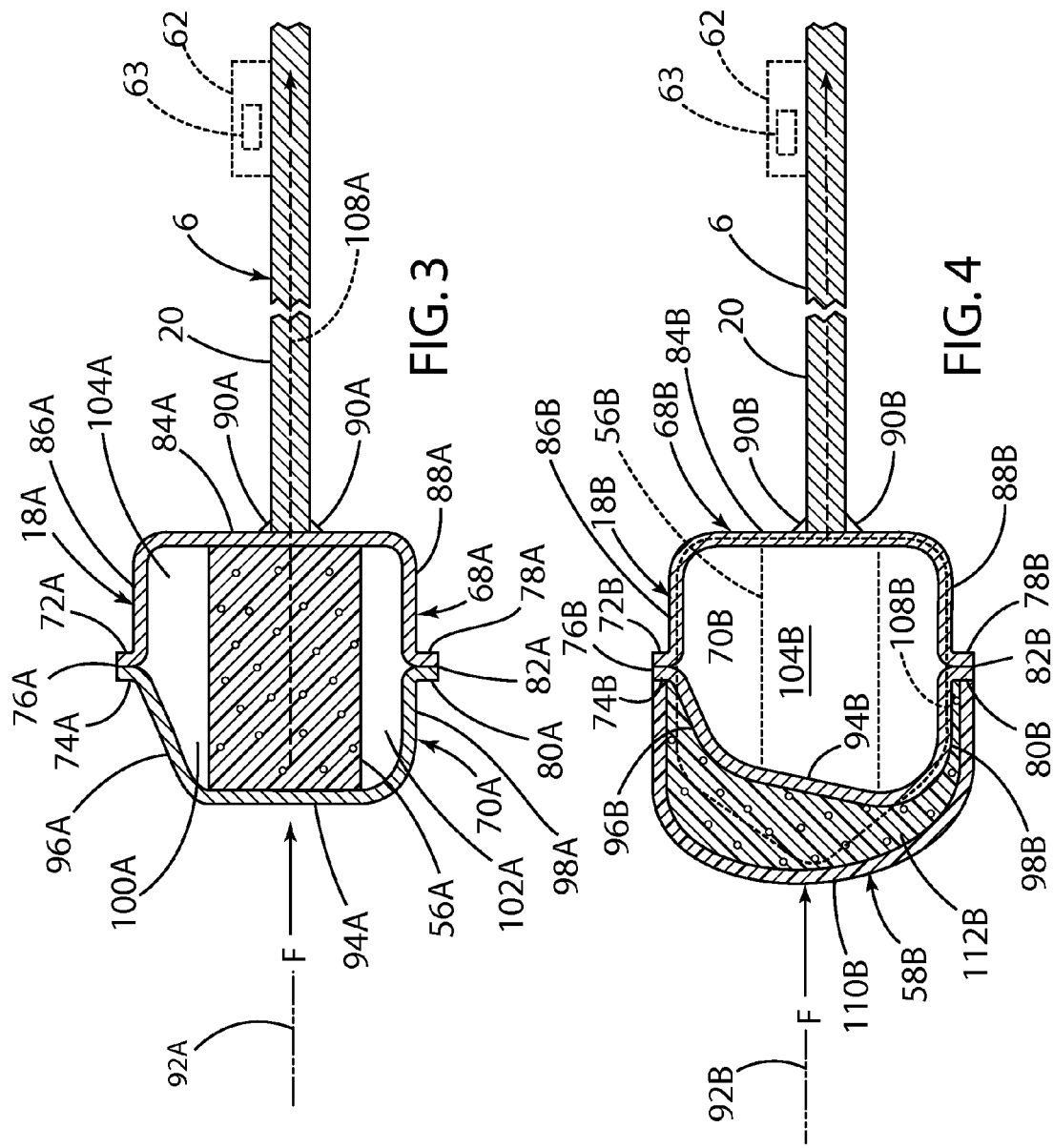

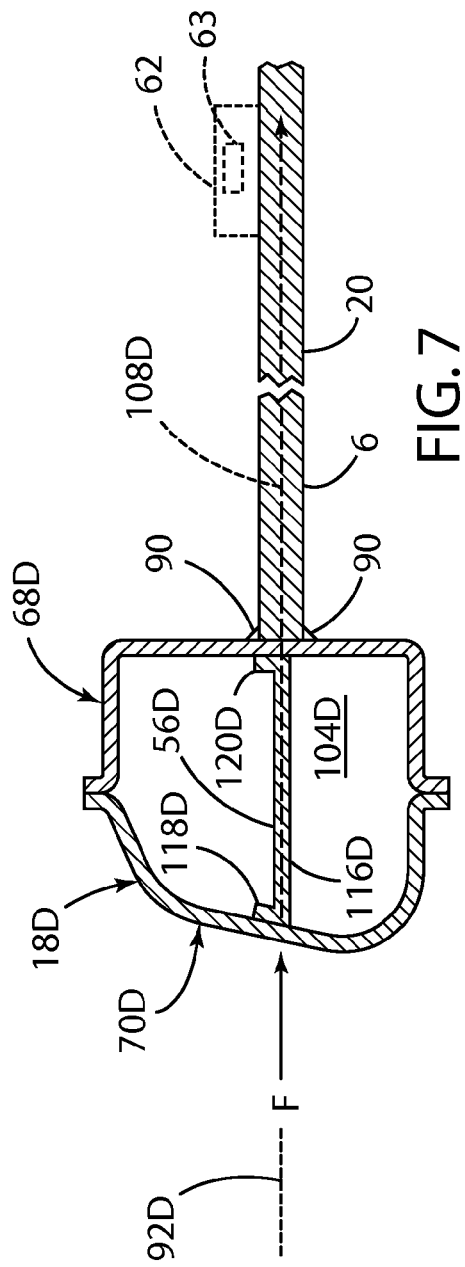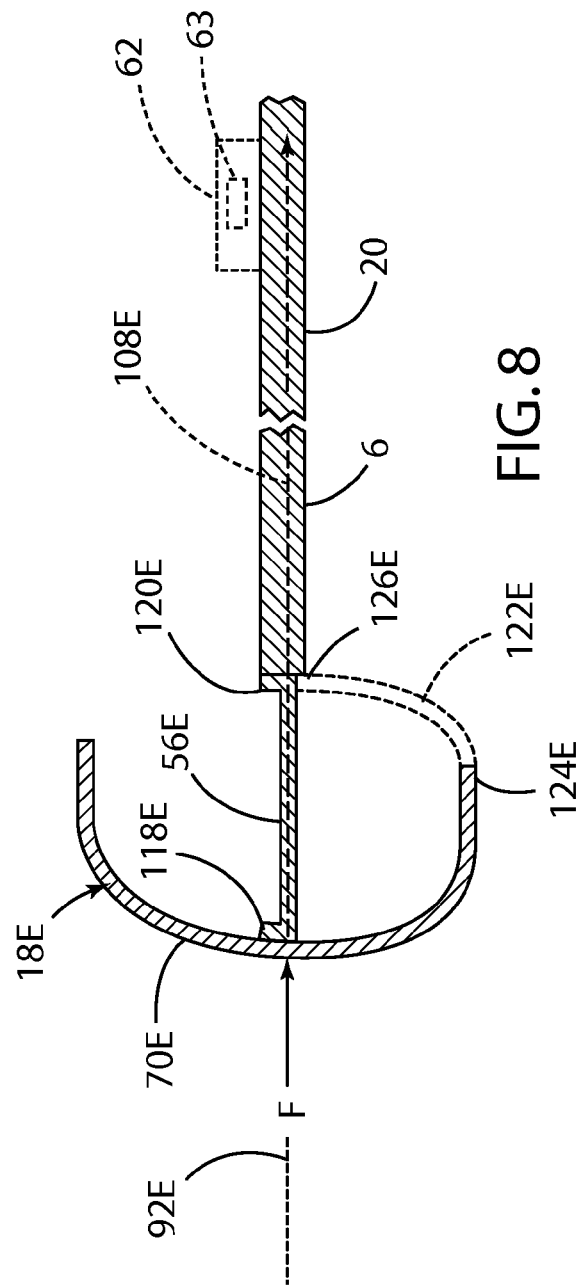

PASSIVE STRUCTURAL DESIGN THAT IMPROVES IMPACT SIGNAL DURING SIDE IMPACT

FIELD OF THE INVENTION

The present invention generally relates to motor vehicles, and more particularly, to a vehicle structural design and crash sensing system that distinguishes between vehicle crashes and non-crash events and provides for quicker airbag deployment if a vehicle crash event occurs.

BACKGROUND OF THE INVENTION

Motor vehicles may be tested to determine the effects of a side impact on a vehicle door. Such tests are known as a "pole test." These tests seek to simulate the effects of a crash even involving a side impact on a vehicle door. During the impact of a vehicle subjected to a lateral speed of 20 mph, contact between the occupant and the interior side structure of the vehicle can occur during the first 20 ms.

Vehicles may be equipped with pressure sensors in the doors to detect an early impact and deploy airbags or other restraint systems. The sensors contain elements whose deformations are measured and converted to electrical signals representing pressure values in the door cavities. Pressure sensors are generally effective in measuring deformations in a door cavity indicative of a vehicle crash with a Moving Deformable Barrier (MDB) or pole. However, there are events where deformation of the door cavity can occur, but deployment of side restraints (e.g. side airbags) are not required or desired. For example, deployment of side airbags would typically not be required as a result of slamming a vehicle door, a very low speed parking lot impact, or other such non crash events. To protect against inadvertent deployments, an acceleration sensor may be placed near the vehicle centerline within a Restraints Control Module (RCM) to determine the plausibility of a crash event. The restraint system may be configured to deploy the side airbags or other restraints only if the pressure sensors detect deformation in a door cavity and an accelerometer also detects acceleration exceeding a predefined threshold.

SUMMARY OF THE INVENTION

One aspect of the present invention is a vehicle structure including a primary structure having a unitized floor structure and an upper vehicle structure above the unitized floor structure. The primary structure defines a passenger space between the unitized floor structure and the upper vehicle structure and includes openings on opposite sides to permit user ingress and egress to the passenger space. The vehicle may include doors that are movably mounted to the primary structure to selectively close off the first and second openings. Rocker structures extend along lower edges of the openings. The rocker structures have a closed cross section and define internal cavities. The rocker structures include upper portions above the internal cavities, lower portions below the internal cavities, an outer portion extending between the upper and lower portions on an outer side of the internal cavities, and inner portions extending between the upper and lower portions on inner sides of the internal cavities. The unitized floor structure may include a center tunnel that extends in a fore-aft direction, and horizontal side portions that extend horizontally between the inner portions of the rockers and the center tunnel. An acceleration sensor is connected to the center tunnel of the floor structure to detect lateral acceleration of the floor structure at the center tunnel. Each rocker includes a substantially rigid central structure disposed in the internal cavity. The rigid central structure extends from the outer portion to the inner portion such that a side impact on the outer portion of the rocker generates a side impact signal that is transmitted through the rigid central structure and at least one of the side portions of the floor structure to the acceleration sensor. The acceleration sensor is able to detect a lateral acceleration due to the side impact signal that has been transmitted through the substantially rigid central structure of the rocker.

Another aspect of the present invention is a vehicle structure including a floor structure having a generally horizontal central portion and opposite side portions. A tubular rocker structure extends in a fore-aft direction along the opposite side portions. The rocker structures further include outer side walls having outwardly facing central portions, upwardly facing upper portions, and downwardly facing lower portions. The rocker structures further include inner side walls, and the opposite side portions of the floor structure are connected to the inner side walls of the rocker structures. A substantially rigid cladding comprising polymer or other suitable materials is disposed on at least a portion of the outer side walls of the rocker structures. The polymer cladding extends over the central portions and at least one of the upper and lower portions such that an impact force on the polymer cladding is transmitted from the polymer cladding to the inner side wall and to the floor structure. The vehicle structure further includes a rigid structural front cross member extending between the rocker structures in front of the central portion of the floor structure. A rigid structural rear cross member extends between the rocker structures. The rear cross member is positioned rearwardly of the central portion of the floor structure. An acceleration sensor is connected to the central portion of the floor structure that is spaced apart from the front and rear cross members.

Another aspect of the present invention is a vehicle including a floor structure with tubular rockers extending fore-aft along opposite sides thereof. The tubular rockers have rigid internal braces extending horizontally inside the rockers between inner and outer side walls of the rockers to directly transmit side impact forces on the rockers into the floor structure. The vehicle further includes rigid, horizontally spaced apart front and rear cross members. An acceleration sensor is mounted on a center portion of the floor structure that is approximately midway between the front and rear cross members.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 3 is a partially fragmentary cross sectional view of a rocker panel and a portion of the floor structure of the vehicle of FIGS. 1 and 2 taken along the line III-III; FIG. 2;

FIG. 4 is a fragmentary cross sectional view of a rocker panel and floor structure of a vehicle according to another aspect of the present invention;

FIG. 5;

FIG. 7 is a partially fragmentary cross sectional view of a rocker structure and floor structure according to another aspect of the present invention;

FIG. 8 is a partially fragmentary cross sectional view of a rocker structure and floor structure according to another aspect of the present invention;

DETAILED DESCRIPTION OF THE PREFERRED EMBODIMENTS

Figure 1:
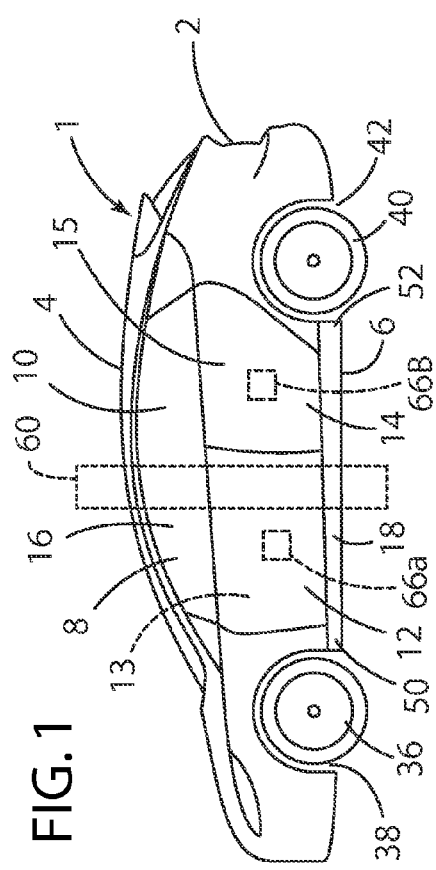
FIG. 1 is a side elevational view of a vehicle according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
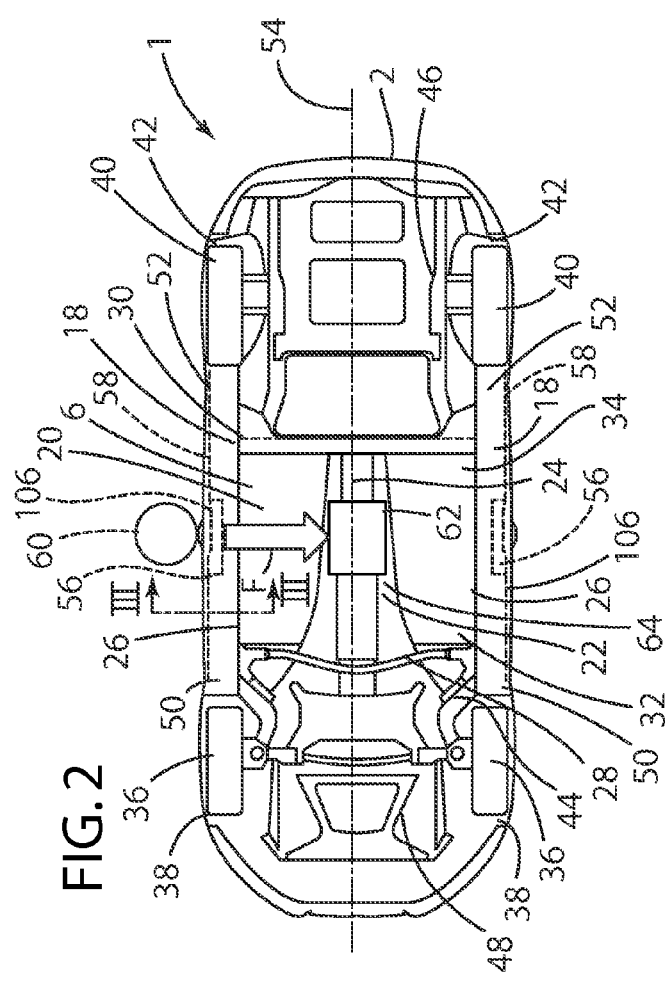
FIG. 2 is a bottom plan view of the vehicle of FIG. 1.

With reference to FIGS. 1 and 2, a motor vehicle 1 includes a vehicle structure 2 having an upper portion 4 and a floor structure 6. The vehicle structure 2 includes side openings 8 and 10 on opposite sides thereof with rocker structures 18 extending below the side openings 8 and 10. As discussed in more detail below, the rocker structures 18 have increased stiffness/strength such that side impact forces on rocker structures 18 are transmitted into floor structure 6 such that a centrally located Restraints Control Module 62 can detect transverse acceleration more quickly to thereby permit quicker deployment of passenger restraints such as side airbags.

The side openings 8 and 10 are selectively closed off by a pair of front doors 12 and a pair of rear doors 14 to provide user ingress and egress to the passenger space 16. In the illustrated example, the vehicle 1 includes front and rear doors 12 and 14, respectively. However, the present invention is not limited to a four door vehicle, and other vehicle configurations (e.g., two door vehicles) are contemplated by the present invention. Furthermore, although the vehicle 1 of FIGS. 1 and 2 comprises an automobile, a vehicle structure according to the present invention may also be utilized in connection with a wide range of vehicles such as pickup trucks, vans, SUVs, sedans, hatchbacks, or virtually any vehicle configuration having rocker panels.

Referring to FIG. 2, floor structure 6 includes a generally horizontal primary or central portion 20 and a center tunnel 22 that extends in a fore-aft direction to accommodate drive train components 24. Rocker structures 18 extend fore-aft along opposite edge portions 26 of floor structure 6. A rigid front cross member 28 extends between the rockers 18 adjacent a front portion 32 of the floor structure 6, and a rigid rear cross member 30 extends between rockers 30 adjacent a rear portion 34 of floor structure 6. The vehicle structure 2 may include a front subframe 44 and rear subframe 46 to support an engine 48 and provide for structural support of the vehicle suspension. The vehicle structure 2 generally comprises a unibody structure, and the vehicle structure 2 therefore does not include a separate ladder-type frame or other such structure.

Vehicle 1 also includes front wheels 36 disposed in front wheel wells 38 and rear wheels 40 disposed in rear wheel wells 42. The rockers 18 include opposite end portions 50 and 52 disposed adjacent front and rear wheel wells 38 and 42, respectively. As discussed in more detail below, the rockers 18 have a generally tubular construction forming an elongated internal space 104A, and extend linearly in a fore-aft direction between the wheel wells 38 and 42. In general, the front cross member 28 extends between the front portions 50 of the rockers 18, and the rear cross member 30 extends between the rear portions 52 of the rockers 18. Thus, the front and rear cross members 28 and 30 together with the rockers 18 form a generally rectangular or quadrilateral structure extending around the primary or central portion 20 of the floor structure 6. In general, the center tunnel 22 extends fore-aft along a vehicle centerline 54 between the front and rear cross members 28 and 30, respectively.

As discussed in more detail below, the rockers 18 have a generally hollow tubular construction, and may include an internal bracing structure 56 and/or an external cladding 58. In the event of an impact with a pole 60 or other object the internal bracing structure 56 (FIG. 3) and/or external cladding 58 (FIG. 4) that directly transmit force "F" from a side impact through the rocker 18 and through the primary or central portion 20 of floor structure 6 to a central portion 64 of center tunnel 22. A Restraints Control Module (RCM) 62 is mounted on the central portion 64 of center tunnel 22. The RCM 62 includes one or more sensors that detect acceleration due to a side impact of the vehicle 1 with a pole 60 or other object. The front and rear doors 12 and 14 include internal cavities 13 and 15, respectively. Pressure sensors 66A and 66B are configured to measure changes in pressure in the cavities 13 and 15. The system may, optionally, include additional acceleration sensors (test shown) that are mounted in doors 12 and 14 and/or other vehicle structures such as the door beam, B-pillar, or other substantial structural member near the outer portion of the vehicle structure. The RCM (or other controller) may be configured to utilize the inputs from the additional sensors to evaluate the plausibility of an impact event to thereby determine if the passenger restraints are to be deployed.

The RCM 62 includes a controller that is configured to access the plausibility of a crash event utilizing pressure information/data from the pressure sensors 66 and acceleration information/data from the accelerometers of the RCM. In the event of a crash event, the RCM 62 actuates ("fires") one or more side airbags and/or other restraints. As discussed in more detail below, the internal bracing structure 56 and/or external cladding 58 of rockers 18 causes an acceleration signal to propagate through the rockers 18 and central portion 20 of floor structure 16 to the accelerometers of RCM 62 in a very short period of time. This enables the RCM to access the plausibility of a crash event and actuate or fire the restraints in a very short amount of time (e.g. about 7 ms). It will be appreciated that this is significantly quicker than similar vehicle structures that do not include internal bracing structure 56 and/or external cladding 58. For example, as discussed in more detail below in connection with FIG. 10, vehicle structures that do not include the internal bracing structure 56 and/or external cladding 58 may have a firing time of 10 ms or more. Significantly, this reduction in time is achieved without positioning the RCM on or adjacent a rigid cross member.

With further reference to FIG. 3, a rocker 18 according to one aspect of the present invention includes an inner member 68A and an outer member 70A. The inner and outer members 68A and 70A are generally C-shaped in cross section, and include upwardly extending flanges 72A and 74A that are welded together along a seam 76. The inner and outer members 68A and 70A also include downwardly extending flanges 78A and 80A that are welded together along a seam 82. The inner and outer members 68A and 70A, respectively, may be fabricated from sheet metal (e.g. steel or aluminum) or other suitable material. Inner member 68A includes a central portion 84A that is welded or otherwise secured to the floor structure 6. The inner member 68A further includes an upper portion 86A and a lower portion 88A. Outer member 70A includes a central portion 94A, upper portion 96A, and lower portion 98A. It will be understood that the rocker members 68A and 70A may have different shapes and sizes as required for a particular application. For example, the central portions 94A and/or 84A may be substantially flat as shown in FIG. 3, or they may have a convex or concave curved contour as required for a particular application. The floor structure 6 comprises sheet metal or other suitable material. Floor structure 6 is generally horizontal, and defines a horizontal floor plane 92A.

Internal bracing structure 56A extends between the central portions 84A and 94A of inner and outer members 68A and 70A, respectively. Bracing structure 56A may comprise high density foam as shown in FIG. 3, or it may comprise metal or other relatively rigid material. If an external force F is applied to the central portion 94A of outer rocker member 70A, the force is transmitted through internal bracing structure 56A and into central portion 20 of floor structure 6. The impact force is transmitted along a direct path 108A to the accelerometers 63 in RCM 62 that is substantially linear, thereby significantly reducing the amount of time required for the signal to travel to RCM 62. The transmission of an impact force in a manner that causes acceleration at the RCM 62 may be referred to herein as a signal.

As discussed below, the internal bracing structures 56A-56F of the embodiments of FIGS. 1-9, respectively, may comprise virtually any material or combinations of materials that have sufficient strength and stiffness to transmit sufficient side impact forces on the rocker structures 18-18F into the floor structure 6 to permit detection of acceleration by RCM 62. For example, the bracing structures 56A-56F may comprise rigid, closed cell foam, polymer honeycomb structures (not shown) polymer or foam structures similar to egg crates, metal (e.g. steel) plates or flanges or other material/structural configurations having sufficient rigidity/stiffness. It will be understood that the internal bracing structures 56A-56F may not be required in every instance, particularly if a relatively rigid cladding (e.g. cladding 58B, FIG. 4, cladding 58C, FIG. 6) is utilized to cover at least a portion of the rocker structure 18-18F. A cladding may optionally be utilized with any of the rocker structures 18-18F to provide increased structural rigidity and thereby reduce the time required for an acceleration detected by RCM 62 to exceed a predefined acceleration threshold 134 described in more detail below in connection with FIG. 10. In general, the bracing structures 56A-56F of FIGS. 1-9 and/or the cladding are configured to significantly reduce the time required to detect a predefined threshold level of acceleration at RCM 62. This reduction in detection time may be on the order of 10%, 20%, 30%, or more relative to rocker structures that do not include an internal bracing structure or a rigid cladding.

In FIG. 3, the RCM 62 is illustrated as being mounted on a relatively flat portion of floor structure 6. However, it will be understood that the RCM 62 may also be mounted to a center tunnel 22 as shown in FIG. 2. In FIG. 3, the foam of internal bracing structure 56A does not completely fill the internal space 104A defined by the tubular rocker structure 18, thereby forming an upper space 100A above the bracing structure 56A, and a lower space 102A below the bracing structure. However, the internal bracing structure 56A may, alternatively, also substantially fill the internal space 104 of rocker structure 18 such that upper and lower spaces 100A and 102A (FIG. 3) do not exist. Also, referring to FIG. 2, the internal bracing structure 56A may have a length (see also length L1, FIG. 5) that is substantially less than the overall length of the rocker structures 18, such that the internal bracing structure 56A only extends across a central portion 106 of rocker structures 18. Alternatively, the internal bracing structure 56A may extend along substantially the entire length of the rocker structures 18.

With further reference to FIG. 4, a rocker structure 18B according to another aspect of the present invention includes inner and outer members 68B and 70B, respectively that are similar to the rocker members 68A and 70B of FIG. 3. The members 68B and 70B are welded together at joints 68B and 82B along flanges 74B, 72B, and 80B, 78B, respectively. In the illustrated example, the outer member 70B has a central portion 94B that is not vertical, but rather angles or slopes inwardly somewhat along the top of the outer member 70B. However, it will be understood that the inner and outer members 68B and 70B, respectively, the central portion 94B may be substantially vertical or it may be sloped outwardly rather than inwardly. The inner member 68B includes a central portion 84B that is welded to the floor structure 6 at welds 90B.

A cladding 58B extends over and around outer rocker member 70B. The exterior cladding 58B may include an outer shell 110B, and internal foam 112B. The shell 110B may comprise a suitable polymer material, a sheet of metal (e.g. steel), or other suitable material, and the foam 112B may comprise a substantially rigid foam or other material having sufficient stiffness/rigidity to transmit force. The cladding 58B is relatively rigid, such that an impact force F at horizontal plane 92B of floor structure 6 is transmitted through the cladding 58B along a load path 108B around the upper portions 86B and 88B of inner rocker member 68B and through the central portion 20 of floor structure 6. Rocker structure 18B may optionally include an inner bracing structure 56B that is similar to bracing structure 56A (FIG. 3). The internal bracing structure 56B may comprise high density foam, metal, or other suitable material as may be required for a particular application. The external cladding structure 58B (and internal bracing structure 56B, if present) significantly increases the rigidity of the rocker structure 18B, and allows a signal due to an external impact force F to travel through the central portion 20 of floor structure 6 to the RCM 62 in significantly less time than conventional rocker structures that do not include the cladding 58B and/or internal bracing structure 56B.

Figure 5:
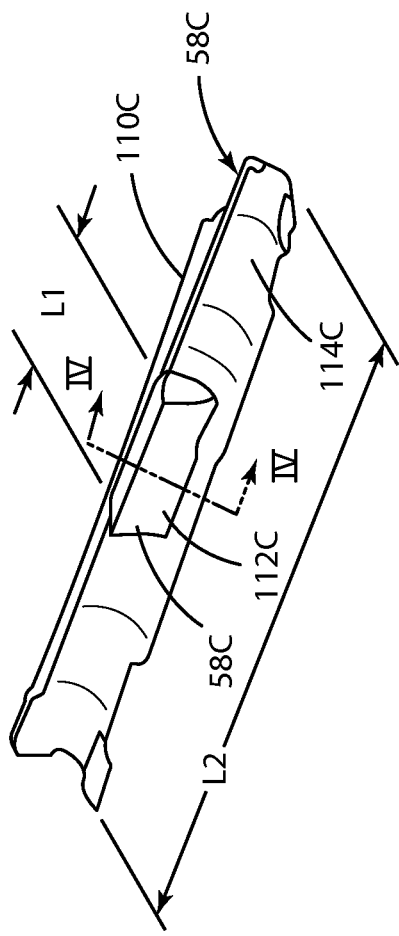
FIG. 5 is an isometric view of a cladding for rocker structures according to another aspect of the present invention.
Figure 6:
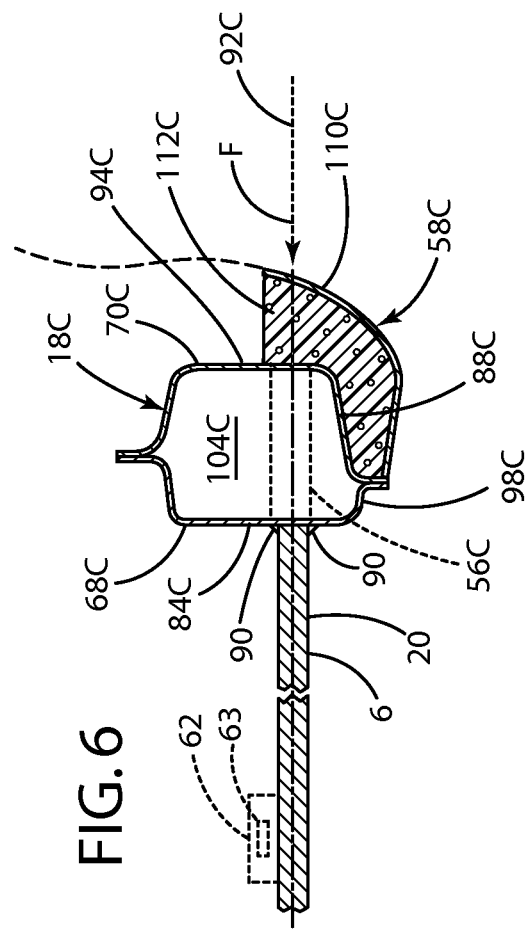
FIG. 6 is a cross sectional view of a cladding, rocker panel, and floor structure of FIG. 5 taken along the line IV-IV.

With further reference to FIGS. 5 and 6, a tubular rocker structure 18C according to another aspect of the present invention includes inner and outer members 68C and 70C that may be formed from sheet metal or other suitable material and welded together in substantially the same manner as described above in connection with the rocker structures 18A and 18B (FIGS. 3 and 4). An external cladding 58C includes an outer shell 110C and inner foam 112C. The outer shell 110C may have a C or L shape, and the inner foam 112C may be adhesively bonded directly to the outer rocker member 70C. The length "L1" (FIG. 5) of the foam 112 may be significantly less than the length "L2" of the outer shell 110C. The length L2 of the outer shell 110C may be substantially equal to the overall length of the rocker structure 18C (i.e. rockers 18 of FIGS. 1 and 2), and the rocker structure 18C may extend across substantially the entire length of the vehicle between the front and rear wheel wells 38 and 40. The foam 112C may be adhesively bonded to an inner surface 114C of outer shell 110. The inner foam 112C may be positioned outboard of central portion 20 of floor structure 6 (FIG. 2) such that the inner foam 112C is generally aligned with RCM 62. An impact force F is transmitted through the shell 110C and foam 112C into outer rocker member 70C, and the load travels around lower portions 88C and 98C of inner and outer rocker members 70C and 68C. A signal (force) due to an impact force F is transmitted through the central portion 20 of floor structure 6 to the RCM 62. Although a portion of the signal may be transmitted through the front and rear cross members 28 and 30, a sufficiently large signal travels through central portion 20 of floor structure 6 to permit sensors 63 of RCM to detect a crash event. The central portion 20 of floor structure 6 may comprise sheet metal or other relatively thin material to provide sufficient passenger space 16 (FIG. 1) without requiring increased vehicle height.

An inner bracing structure 56C may optionally be disposed within internal space 104C of rocker structure 18C. The internal bracing structure 56C may comprise high density foam, metal, or other suitable material. The inner foam 112 may extend substantially the entire length of outer shell 110C, such that the inner foam 112C has a length that is substantially equal to the length L2 (FIG. 5).

With further reference to FIG. 7, a rocker structure 18D according to another aspect of the present invention includes inner and outer members 68D and 70D, respectively, that may be welded together to form an internal space 104D. An internal structure 56D extends between the inner and outer rocker members 68D and 70D along a plane 92D of floor structure 6. The internal bracing structure 56D may comprise a metal structure having a generally planar central portion 116D with flanges 118D and 120D that are secured to the inner and outer rocker members 68D and 70D by welding or other suitable arrangement. The bracket or internal structure 56D provides for direct transmission of a signal caused by an external force F along a relatively straight path 108D to the RCM 62. It will be understood that the structure 56D may comprise a plurality of individual bracing members, or it may comprise a single member that extends along a portion of the length of the rocker structure 18D (e.g. internal structure 56D could have a length similar to the length L1 of FIG. 5). Alternately, the internal bracing structure 56D could extend along substantially the entire length of the rocker structure 18D.

With further reference to FIG. 8, a rocker structure 18E according to another aspect of the present invention may include a single rocker member 70E that is substantially C shaped. An internal bracing structure 56E provides for a direct load path 108E in the event an external force F is applied to the rocker structure 18E. The outer rocker member 70E may optionally include an inner portion 122E that extends from lower end portion 124E of outer member 70E to an outer edge portion 126E of floor structure 6.

Figure 9:
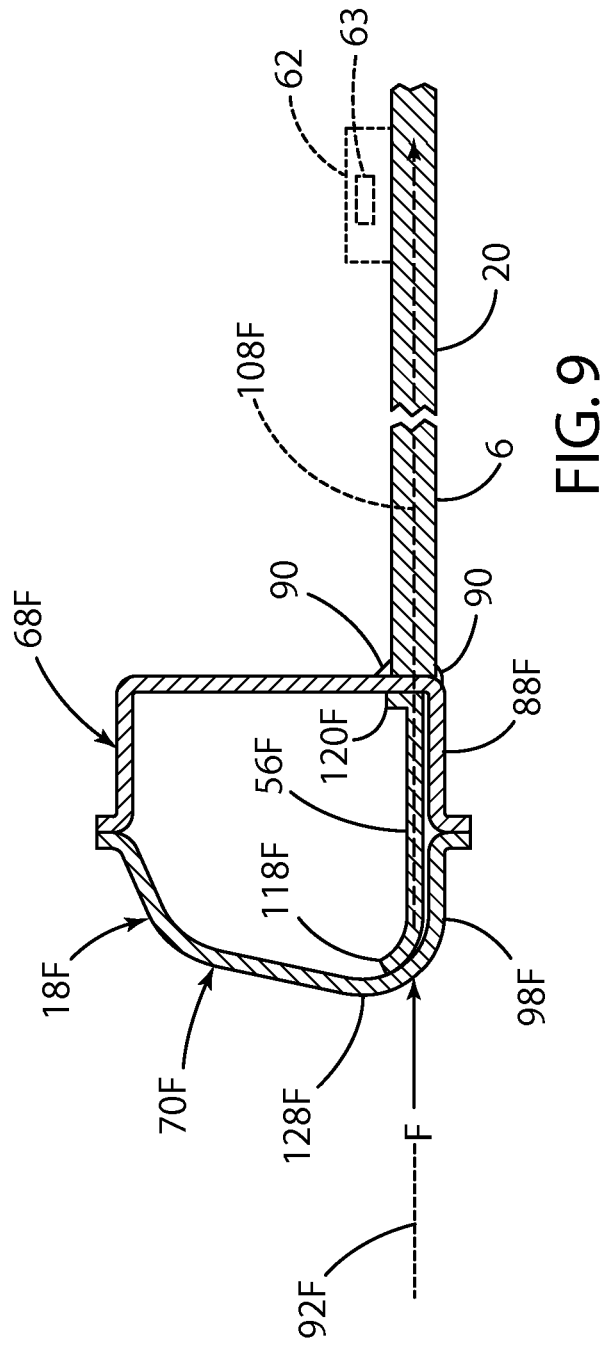
FIG. 9 is a partially fragmentary cross sectional view of a rocker structure and floor structure according to another aspect of the present invention.

With further reference to FIG. 9, a rocker structure 18F according to another aspect of the present invention includes inner and outer members 68F and 70F, respectively that may be welded together as described above in connection with FIGS. 3-8. An optional inner bracing structure 56F extends along lower portions 88F and 98F of inner and outer rocker member 68F and 70F, respectively. The outer rocker member 70F is generally contoured such that the lower portion 128F protrudes outwardly somewhat, such that a force F due to an external impact is transmitted directly along a relatively linear load path 108F to the RCM 62 and accelerometers 63. However, the rocker members 68F and 70F may have virtually any shape as required. The internal bracing structure 56F may comprise metal or other suitable material, and may be welded to the inner and outer rocker members 68F and 70F, respectively.

The rocker structures 18-18F of FIGS. 1-9 preferably extend linearly along opposite edge portions 26 of floor structure 6 (FIG. 1). However, the rocker structures 18-18F may have a non-linear curved configuration according to other aspects of the present invention. Also, with the exception of rocker 18E, rockers 18-18F of FIGS. 1-9 preferably have a two piece "clam shell" type construction wherein the inner and outer sheet metal components are welded together. However, the rockers 18-18F may comprise one piece members and may have virtually any suitable construction and may have virtually any contour and cross sectional shape. An RCM 62 of a vehicle having a rocker structure as described in more detail above in connection with FIGS. 1-9 generates a signal to deploy the side impact air bags and/or other restraints in significantly less time than a similar vehicle having a conventional rocker structure.

Figure 10:
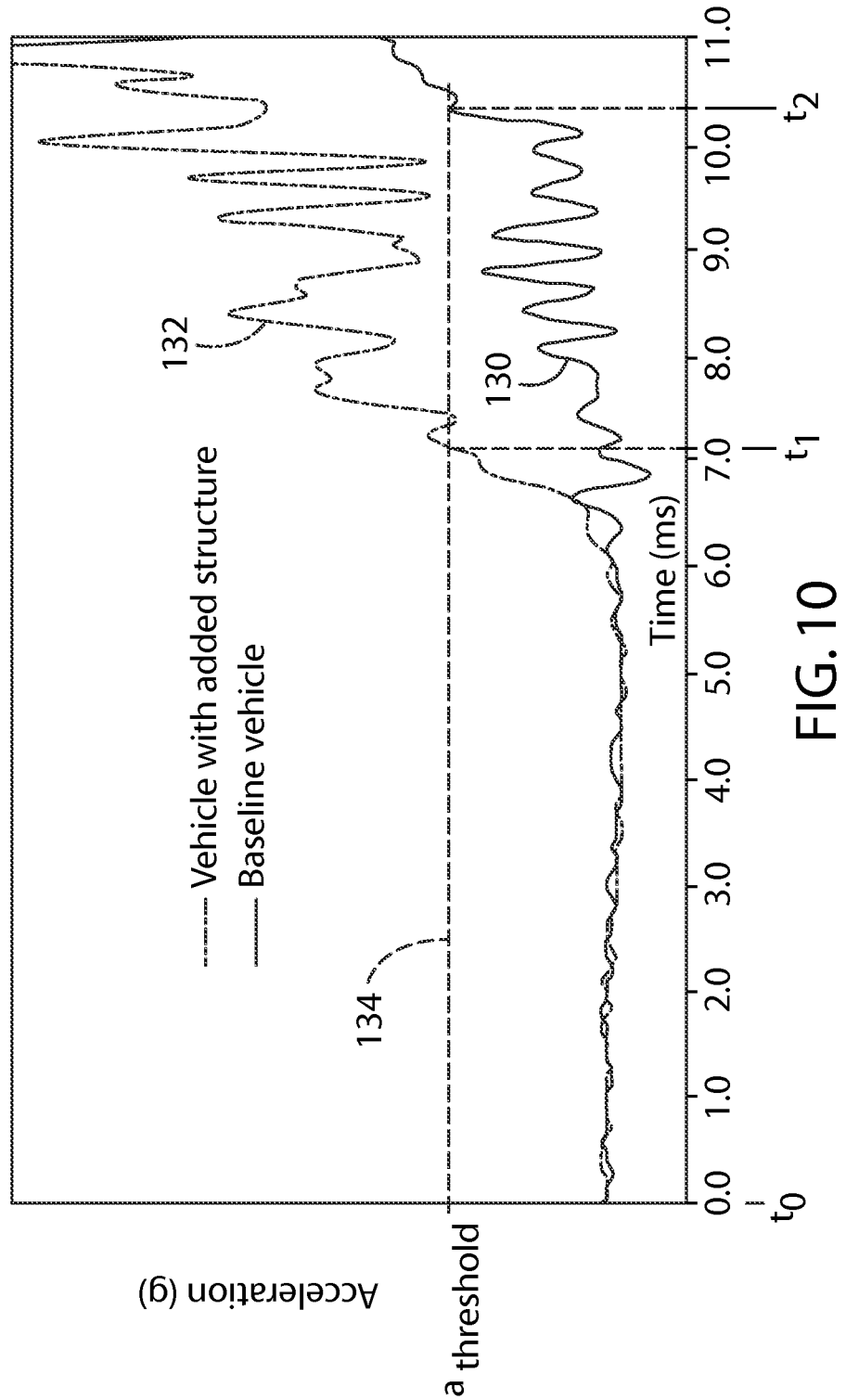
FIG. 10 is a graph showing measured vehicle acceleration resulting from an oblique pole impact.

FIG. 10 is a graph showing test results (i.e. the acceleration measured by an RCM 62) of a baseline vehicle (line 130) having a conventional rocker structure with no internal rocker structure or cladding during a "pole test." FIG. 10 also shows the acceleration measured by an RCM (line 132) during a pole test of a vehicle including a rocker structure according to the present invention. A predefined acceleration threshold 134 is chosen as a criteria to determine if a sufficiently large acceleration has been measured by RCM 62 to detect a side impact event requiring deployment of side air bags and/or other passenger restraints. In the illustrated example, the acceleration threshold 134 required at accelerometers 63 to fire or deploy the restraints is in the range of about 2.0 g to about 6.0 g. The acceleration threshold may be selected according to the requirements of a particular vehicle type or other relevant criteria. Referring again to FIG. 10, time $\tau_0$ (0.0 seconds) corresponds to the moment of impact of vehicle 1 on a pole 60 (FIGS. 1 and 2) during a "pole test." The accelerometers of the RCM of the baseline vehicle reach the threshold 134 at a time $\tau_2$ of about 10.4 ms. However, as shown by the line 132, the accelerometers 63 of an RCM 62 of a vehicle having a rocker structure according to the present application exceeds the acceleration threshold 134 at a time τ2 of about 7.2 ms. In general, the times τ, and $\tau_2$ are the times at which RCM 62 determines that a side impact event has occurred and generates a signal to deploy the side airbags and/or other passenger restraints. In the example of FIG. 10, the reduction in time (ΔT) to deploy the restraints is about 3.2 ms (i.e. on the order of a 30% reduction in the time delay). However, the actual reduction in deployment time will depend on the specific vehicle structure and rocker structure utilized in a particular application of the present invention.

The RCM 62 may be configured to deploy/fire the restraints only if a door pressure sensor 66A (FIG. 1) detects a pressure increase and the accelerometers 63 of RCM also detect an acceleration exceeding the acceleration threshold 134.

As shown in FIG. 10, the rocker structure of the present invention significantly reduces the time required for the accelerometer 63 of RCM 62 to exceed the acceleration threshold. The rocker structure of the present invention thereby permits significantly faster deployment of the side impact airbags or other restraint systems, while still providing for accurate assessment of the plausibility of a crash event to prevent unwanted/inadvertent deployment of the side airbags. Significantly, rocker structures according to the present invention permit the force F (FIG. 2) to be transmitted directly through the primary or central portion 20 of the floor structure 6 to the RCM 62 even if an impact force F is applied to the rocker structure 18 at a location that is midway between the front and rear cross members 28 and 30, respectively. Furthermore, the internal bracing 56 and/or external cladding 58 may be utilized in connection with rocker structures 18 that are substantially similar to known rocker structures such that extensive modification of the rocker structures and other related structures is not required.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle structure, comprising:
a primary structure including a unitized floor structure having opposite side edge portions and an upper vehicle structure above the unitized floor structure, wherein the primary structure defines a passenger space between the unitized floor structure and the upper vehicle structure with openings on opposite sides to permit user ingress and egress to the passenger space;
rocker structures extending along the opposite side portions of the floor structure below the openings, wherein each rocker structure has a closed cross section and defines an internal cavity;
each rocker structure including an upper portion above the internal cavity, a lower portion below the internal cavity, an outer portion extending between the upper and lower portions on an outer side of the internal cavity, and an inner portion extending between the upper and lower portions on an inner side of the internal cavity, the unitized floor structure including a center tunnel that extends in a fore-aft direction and side horizontal portions extending outwardly from the center tunnel to the inner portions of the rockers;
an acceleration sensor connected to the center tunnel of the floor structure to detect lateral acceleration of the floor structure; and wherein:
at least one of the rockers includes a substantially rigid central structure disposed in the internal cavity and extending from the outer portion of the rocker structure to the inner portion of the rocker structure such that a side impact on the outer portion of the rocker generates a side impact signal that is transmitted through the substantially rigid central structure and at least one of the side horizontal portions of the floor structure to the acceleration sensor, whereby the time required for the acceleration sensor to detect an acceleration exceeding a predefined threshold is significantly reduced due to the rigid central structure.

2. The vehicle structure of claim 1, wherein:
the substantially rigid central structure comprises foam.

3. The vehicle structure of claim 2, wherein:
the rocker comprises a sheet metal tubular structure that extends fore-aft.

4. The vehicle structure of claim 3, wherein:
the rocker is substantially linear.

5. The vehicle structure of claim 4, wherein:
the rocker comprises inner and outer members that are generally C-shaped in cross section, each having an upwardly extending flange at an upper edge and downwardly extending flange at a lower edge, and wherein the upwardly extending flanges and the downwardly extending flanges of the inner and outer members are welded together.

6. The vehicle structure of claim 1, wherein:
the floor structure includes a forward portion, a rear portion, and a central portion between the forward portion and the rear portion including a rigid structural front cross member extending side-to-side across the floor structure adjacent the forward portion thereof, and a rigid structural rear cross member extending side-to-side across the floor structure adjacent the rear portion thereof, and wherein the sensor is positioned at a central location between the front and rear cross members.

7. The vehicle structure of claim 6, wherein:
the center tunnel extends between the front and rear cross members and defines a center that is about halfway between the front and rear cross members; and wherein:
the sensor is positioned at the center of the center tunnel.

8. The vehicle structure of claim 1, including:
a substantially rigid cladding extending over at least a substantial portion of the outer portion of each rocker structure;
at least two doors, each defining a door cavity;
pressure sensors configured to detect deformation of the door cavities resulting from impacts on the doors;
a controller operably connected to the acceleration sensor and to the pressure sensors, and wherein the controller utilizes data from the acceleration sensor and at least one pressure sensor to determine the plausibility of a crash event.

9. The vehicle structure of claim 8, wherein
the cladding comprises a solid polymer outer shell and a foam core disposed between the outer shell and the outer portions of the rocker structures.

10. A vehicle structure, comprising:
a floor structure including a generally horizontal central portion and opposite side portions;
tubular rocker structures extending fore-aft along the opposite side portions, the rocker structures including outer side walls having outwardly facing central portions, upwardly facing upper portions, and downwardly facing lower portions, the rocker structures further including inner side walls, and wherein the opposite side portions of the floor structure are connected to the inner side walls of the rocker structures;
cladding disposed on the outer side walls of the rocker structures and extending over the central portions of the rocker structures and at least one of the upper and lower portions such that an impact force on the cladding is transmitted to the inner side wall and to the floor structure, wherein the cladding comprises an outer polymer shell and substantially rigid foam material disposed between the outer polymer shell and at least a portion of the outer side wall, and wherein the cladding extends over both the upper and lower portions of the outer side wall; and;

an acceleration sensor connected to the central portion of the floor structure that detects acceleration resulting from impacts on the cladding.

11. The vehicle structure of claim 10, wherein:

the floor structure includes a center tunnel;

the acceleration sensor is mounted to the center tunnel.

12. The vehicle structure of claim 10, wherein:

each of the rocker structures includes a rigid internal structure extending horizontally between the inner and outer side walls.

13. The vehicle structure of claim 10, including:

doors having door cavities;

pressure sensors configured to sense a change of pressure in the door cavities resulting from an impact on the door; and a controller that utilizes data from the acceleration sensor and the pressure sensors to determine if a crash event has occurred.

14. The vehicle structure of claim 10, wherein:

a rigid structural front cross member extending between the rocker structures in front of the central portion of the floor structure;

a rigid structural rear cross member extending between the rocker structures wherein the rear cross member is positioned rearwardly of the central portion of the floor structure.

15. A vehicle, comprising:

a floor structure with tubular rockers extending along opposite sides thereof, each rocker having an outer side wall, cladding over the outer side wall, and foam between the outer side wall and the cladding;

rigid horizontally spaced apart front and rear cross members extending between and interconnecting the rockers; and an acceleration sensor on a center portion of the floor structure midway between the front and rear cross members.

16. The vehicle of claim 15, including:

doors having door cavities;

door pressure sensors that detect changes in door cavity pressure resulting from impacts on the doors; and:

a controller configured to determine the plausibility of a crash event based on data from the acceleration sensor and one or more of the door pressure sensors, and wherein the controller causes at least one passenger restraint device to deploy if the controller determines that a crash event is plausible according to predefined criteria.

17. The vehicle of claim 16, wherein:

the controller generates a signal to deploy an airbag if an acceleration detected by the acceleration sensor exceeds a predefined threshold; and the acceleration detected by the acceleration sensor exceeds the predefined threshold within significantly less than 10 ms following a crash impact on a rocker.

18. The vehicle of claim 17, wherein:

the predefined threshold is in a range of about 2 g-forces to about 6 g-forces.

19. The vehicle of claim 18, wherein:

the predefined threshold is exceeded in about 7 ms or less following a crash impact on a rocker.

* * * * *